United States Patent [19]
Maitino et al.

[11] Patent Number: 6,131,101
[45] Date of Patent: Oct. 10, 2000

[54] ELECTRONIC PROCESSING OF MAILING LISTS

[75] Inventors: Philip M. Maitino, Laguna Niguel; Fred A. Rosenbaum, San Clemente, both of Calif.

[73] Assignee: Melissa Data Corp., San Clemente, Calif.

[21] Appl. No.: 08/898,364

[22] Filed: Jul. 22, 1997

Related U.S. Application Data

[60] Provisional application No. 60/030,555, Nov. 14, 1996, and provisional application No. 60/036,093, Jan. 17, 1997.

[51] Int. Cl.$^7$ .................................................. G06F 17/30
[52] U.S. Cl. ............................. 707/201; 707/500; 705/14
[58] Field of Search .................................. 707/201, 500; 705/14

[56] References Cited

U.S. PATENT DOCUMENTS

| | | | |
|---|---|---|---|
| 4,908,761 | 3/1990 | Tai .............................................. | 705/14 |
| 5,696,906 | 12/1997 | Peters et al. ............................... | 705/34 |
| 5,710,886 | 1/1998 | Christensen et al. ...................... | 705/14 |
| 5,781,634 | 7/1998 | Cordery et al. ............................ | 380/25 |
| 5,822,735 | 10/1998 | De Lapa et al. .......................... | 705/14 |
| 5,881,131 | 3/1999 | Farris et al. ............................... | 379/27 |
| 5,930,479 | 7/1999 | Hall .......................................... | 709/238 |
| 6,035,280 | 3/2000 | Christensen ............................... | 705/14 |

*Primary Examiner*—Wayne Amsbury
*Attorney, Agent, or Firm*—Robert D. Fish; Fish & Associates, LLP

[57] ABSTRACT

Apparatus and methods are provided in which software resident on a user's computer interfaces with software and/or supplemental information resident on a provider's computer via a transmission line to manipulate a batch of data from a plurality of records extracted from a user's mailing list. In a preferred embodiment, the user resident software directs the user's computer to extract data from multiple records within the user's mailing list. The user resident software then batches the extracted information, and transmits it across a transmission line to the provider's computer. The provider's computer then performs mailing list related functions on the batch using the provider resident software and information. The provider's computer then either transmits updated, sorted or otherwise modified data back to the user's computer for reintegration into the user's mailing list, print labels, reports or produce other output at the provider's location, or performs some other function with the data.

10 Claims, 1 Drawing Sheet

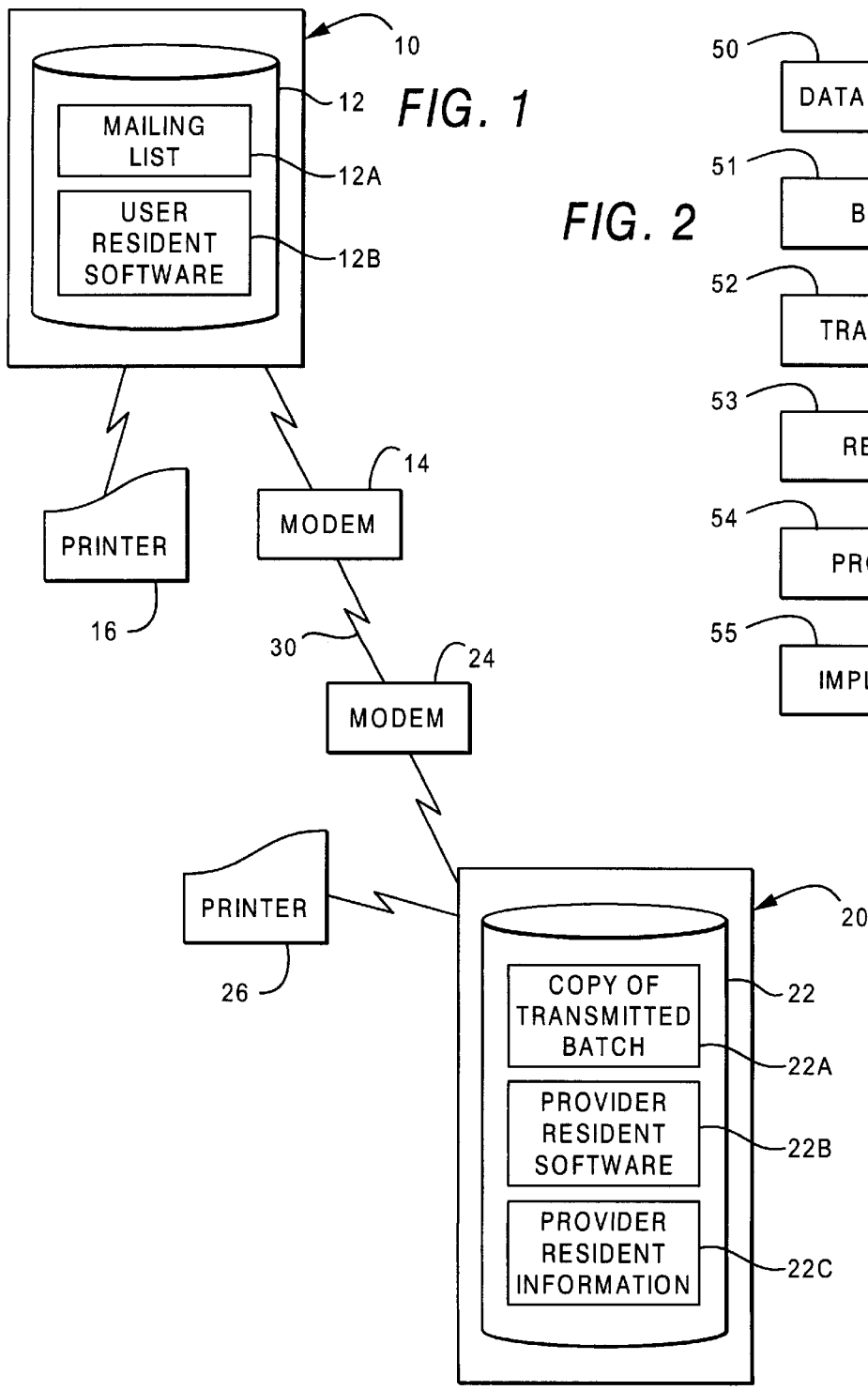
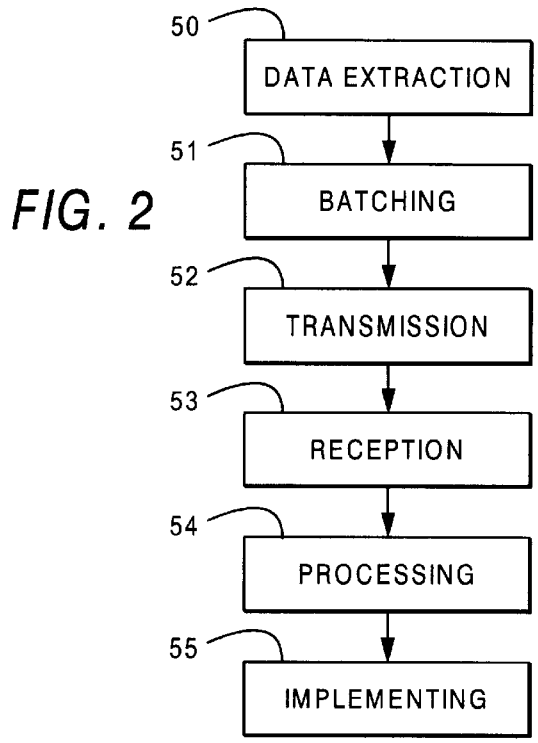

ELECTRONIC PROCESSING OF MAILING LISTS

This application claims priority to Provisional application Ser. No. 60/030,555 filed Nov. 14, 1996 and Provisional application Ser. No. 60/096,193 filed Jan. 17, 1997.

FIELD OF THE INVENTION

The field of the invention is electronic mailing lists.

BACKGROUND OF THE INVENTION

The use of databases to store mailing addresses is well known. Such databases, which are generically referred to hereinafter as "mailing lists," often include names, addresses, phone numbers and miscellaneous demographic information. They are commonly utilized to store customer and prospect information, although they may also be used in conjunction with other applications.

It is often advantageous to manipulate data contained in mailing lists using external resources such as proprietary data processing software and supplemental information. The data manipulation may take many forms, but usually involves modifying, updating, supplementing, sorting, creating new files or performing other functions on the data in ways that save or make money for a user. For example, addition of the "+4" portion of the "ZIP+4" zip code to the address portion of a user's mailing list can provide substantial cost savings from the US Postal Service in future mailings. As another example, a telephone number can sometimes be added to a user's data based upon the name and address. This can aid a company by converting a mailing list into a telemarketing list.

Problems sometimes arise, however, in that the external resources used to manipulate the mailing list data may be relatively extensive and subject to frequent updates. Previous systems have addressed such problems using three basic methods. One previously known method (Method 1) loads the external resources onto a user's computer. In this method, the user performs all updating, sorting and other manipulation of the mailing list data, and the provider periodically sends the user updates to the supplemental information on a storage device such as CD-ROM or diskette. This method is very useful for entities which have relatively large mailing lists and/or perform relatively large mailings, but is also relatively expensive because the users must pay for periodic updates to the supplemental information to keep the information current.

In the second previously known method (Method 2) none of the external resources are loaded onto the user's computer. Instead, the user downloads some or all of his mailing list files onto a floppy disk, tape or other electronic media, and then mails that media to a provider. Alternatively, the user can upload his mailing list files to the provider's central computer via a bulletin board or the Internet. Once the files have been transmitted, the provider may update, sort or perform other manipulation on the data, and may produce labels, print summary listings or perform other tasks. The provider may also update the data, and return it to the user via mail, Internet, or other means for incorporation into the user's mailing list. Method 2 is advantageous because it can be less expensive than Method 1 for relatively small users, but it is disadvantageous in that the time delay for the shipping, processing and receiving back of the disks may prove burdensome.

Method 3 is really an on-line inquiry method, in which once again none of the external resources are loaded onto the user's computer. In this method a user enters information about a single address onto a provider's data entry screen, and the provider provides correction or other information regarding that single address. For example, a user may enter an address onto the data entry screen at the U.S. Postal Service's Internet address, and the Postal Service computer will provide an address correction or an appropriate zip code. This method has many advantages including low cost and rapid response, but is severely limited by the requirement of manipulating only a single address at a time.

All of these previously known systems have achieved substantial commercial success, depending upon the target market. Relatively large users find it cost effective to have the proprietary software and supplemental information available on the user's computer (Method 1), relatively small users find it cost effective to use the disk method (Method 2), while individuals and very small users find it cost effective to use a single record approach (Method 3). In this manner, it was thought previously that all of the various sized markets were adequately addressed.

There is, however, yet another market which has not been properly addressed that can benefit from a more efficient method of operation. This market comprises users which are too small to justify purchasing and loading proprietary software and supplemental information onto their own system, but handle too many records or perform mailings too frequently to be sending data disks through the mail.

SUMMARY OF THE INVENTION

The present invention provides apparatus and methods in which software resident on a user's computer ("user resident software") interfaces with software and/or supplemental information resident on a provider's computer ("provider resident software and information") via a transmission line to manipulate a batch of data from a plurality of records extracted from a user's mailing list.

In a preferred embodiment, the user resident software directs the user's computer to extract data from one or more records within the user's mailing list. The user resident software then batches the extracted information as necessary, and transmits it across a transmission line to the provider's computer. The provider's computer then performs mailing list related functions on the batch using the provider resident software and information. The provider's computer then either transmits updated, sorted or otherwise modified data back to the user's computer for reintegration into the user's mailing list, print labels, reports or produce other output at the provider's location, or performs some other function with the data.

In alternative embodiments, the user and provider resident software can interface such that the provider's computer directs the user's computer to extract the batch, and either the user's or provider's computer are used to transmit, update, sort or otherwise manipulate the batch using the provider resident information.

The apparatus and methods set described herein are advantageous compared to the previously known methods. In particular, the inventive apparatus and methods taught herein are well suited to users who find it tedious or otherwise problematic to use disks to transfer the information, but perform too few or too small mailings to justify maintaining a large amount of proprietary software and supplemental information on the user's computer.

BRIEF DESCRIPTION OF THE DRAWINGS

FIG. 1 is a schematic of a preferred hardware configuration according to the present invention.

FIG. 2 is a flow chart showing operational steps according to a preferred embodiment of the present invention.

DETAILED DESCRIPTION

In FIG. 1, a preferred configuration generally includes a user's computer 10 with associated memory 12, modem 14 and printer 16, and a provider's second computer 20 with associated memory 22, modem 24, and printer 26. The computers 10 and 20 are connected via their respective modems 14, 24 through a transmission line 30.

As used herein, the term "computer" is interpreted broadly, and specifically includes associated data storage and communication devices such as CD-ROM disk drives and modems, computers with single or multiple central processing units, and computers connected through a Local Area Network (LAN). The term does not include otherwise unrelated computers which are connected through a Wide Area Network such as the Internet.

Also as used herein, the term "transmission line" is interpreted broadly to include not only a telephone line, but also any form of essentially immediate electronic transmission including cable and satellite transmission. Here it is important to note that transmission lines which involve delays of several minutes or longer, as for example, transmissions taking place over the Internet, do not prevent such lines from being included in the broad classification herein of transmission line. The term "transmission line" is not limited to any particular physical path, and includes multiple routings that may occur during transmission.

Similarly, the term "electronic transmission" as used herein means transfer of data in which the data is only transiently present at some point along the transmission route. Thus, transmission through a telephone or cable network (including Internet) is included within the term "electronic transmission" because the signals are only transiently present in the telephone, cable, or routing computer. Electronic transmission also includes transmissions in which the transmitting and receiving points are not necessarily at the endpoints of a chain.

Memory 12 includes all manner of data storage devices, including random access memory (RAM) and long term memory such as disk drives, magnetic tapes, CD ROMs and so forth, one or more of which may actually be connected to computer 10 at any given time. Loaded onto memory 12 are or more databases which are collectively referred to herein as the user's mailing list 12A, along with user resident software 12B which may direct extracting, batching and transmitting all or portions of the mailing list 12A. In a preferred embodiment, software 12B directs computer 10 to extract data from mailing list 12A, batch the extracted data together, and then transmit the batch through modems 14 and 24 and transmission line 30 to computer 20.

Memory 22 on the provider's computer 20 is similar to memory 12 on the user's computer in that it can include all manner of memory devices, including random access memory and long term memory such as disk drives, magnetic tapes, CD ROMs and so forth. Following the transmission discussed above, memory 22 also includes a copy 22A of the batch transmitted from the user's computer 10, provider resident software 22D and provider resident information 22E. Once batch 22A is received, either in whole or in part, the software 22D directs computer 20 to update, sort or otherwise process the received data. Depending on the user's instructions, which may or may not be transmitted along with the batch, the provider's computer 20 then either prints labels on the provider's printer 26, or sends data back to the user's computer 10 for reintegration into the mailing list 12A, or printing on the user's printer 16.

As used herein, both the terms "user" and "provider" should be interpreted broadly, to include individuals, groups of persons, organizations, companies and so forth. It is contemplated that the user and provider will be separate legal entities. The term "resident" should also be interpreted broadly, to include software, data and other information which is loaded into a memory, however transiently.

It is contemplated that data packing either may or may not take place for batches being transmitted across the transmission line to reduce the transmission duration. Various data packing methods are known, including those incorporated into modems and the like, and there is presently no particular preference as to data packing techniques.

The term "database" is interpreted herein broadly. The term thus includes any structured relationship of related data including fixed length and/or variable length records. While the data in a database may include postal addresses, the data is definitely not limited to postal addresses, and may also include name, title, telephone numbers, employment, income and other information.

FIG. 2 illustrates various steps 50–55 in a typical embodiment. In a first step 50, data is extracted from a user's database. As noted above, this extraction step can be directed by either the user or the provider resident software, and can be executed by either the user's or the provider's computer having control of the mailing list 12A. The parameters used for extraction of data will depend on the software controlling the extraction. Such parameters will advantageously be left to the user's choice as much as feasible, but will typically include ranges applied to zip code or other various fields in the mailing list. The term "data extraction" does not necessarily mean that data is removed from the mailing list. Indeed, it is preferable that data is only copied from the mailing list rather than moved or deleted from the mailing list.

The next step, batching 51, involves logically collecting data extracted from several different mailing list records. Batching 51 can include collection of the entirety of several different records, collection of subsets of data from different records, or some combination of the two. In a single session, batching may occur once to produce a large batch, or it may occur multiple times as directed by the user or provider resident software.

The next step, transmission 52, is straightforward, with both hardware and software needed to effect transmission being well known. Transmission will generally involve modems on each end of the transmission line, examples of which are also well known. Transmission may optionally involve data packing, which compacts the data for faster transmission. Data packing may occur to a greater or lesser extent depending on hardware and software configurations of the user's and provider's computers, the transmission lines, and other factors, and it is contemplated that data packing may be accomplished under either or both of software or hardware control.

The next step, reception 53, is the flip side of transmission 52. In this step the batch of data transmitted from the user's computer is received by the provider's computer, and unpacked as necessary. The batch is also routed to an appropriate place in memory 22 for further processing.

The next step, processing 54, involves updating, sorting, modifying or otherwise manipulating the batch of data transmitted from the user's computer. The operations performed in this step are advantageously determined by the user as much as feasible, and directions for the processing may or may not be transmitted along with the batch of data. There are many different operations contemplated herein, the following of which are considered to be the most important: (1) a "ZIP+4" operation adds four digit extensions to existing ZIP codes in the batch; (2) a "ZIP" operation adds a zip code to a record based upon a street address; (3) an "ADDRESS CORRECTION" function corrects misspelled street names or other errors; (4) a "SORTING" operation performs a postal presort, adding package and tray numbers which can be printed on labels; (5) a "RADIUS ANALYSIS" operation maps out or otherwise categorizes the geographical distribution of a set of addresses, such as by longitude and latitude or by major markets; (6) a "DATA APPENDING" operation adds additional information such as telephone area code, congressional district or other marketing information; (7) a "NCOA" operation adds change of address information; (8) a "NAME PARSING" operation splits up a single name field into multiple fields (last name, first name, etc.); (9) a "DEMOGRAPHIC PROFILING" operation provides information regarding estimated income, race and so forth from census or other databases; (10) a "PHONE CHECK" operation verifies the validity of phone numbers, adds new phone numbers, and/or updates divided area codes.

The final step, implementing 55, involves doing something usefull with at least a portion of the processed data. This may involve several different non-exclusive substeps, including printing labels on the provider's printer 26, placing information on a CD ROM or other storage device, printing tables, analyses and other reports, and transmitting at least part of the processed data back to the user's computer for integration into the user's mailing list.

Thus, various apparatus and methods for electronic processing of mailing lists have been presented. While specific embodiments and application of this invention have been shown and described, it would be apparent to those skilled in the art that many more modifications are possible without departing from the inventive concepts herein. The invention, therefore, is not to be restricted except in the spirit of the appended claims.

What is claimed is:

1. A method of providing mailing list operations from a first computer having mailing list manipulation software to a second computer having a database which includes a plurality of records containing mailing address data, the method comprising:

the second computer extracting the mailing address data from at least two of the records to produce a batch of data;

the second computer transmitting the batch of data to the first computer over a transmission line;

the first computer processing the batch using the mailing list manipulation software to produce processed data;

the first computer transmitting essentially the processed data and optionally reports related to the processed data back to the second computer; and the second computer providing at least one of the following services: (a) updating the database based upon the result of the processing step; (b) printing labels containing at least a portion of the information contained in the batch; and (c) creating a new file based upon the result of the processing step.

2. The method of claim 1 further comprising the first computer accessing supplemental information used to add ZIP codes to the mailing address data in the batch.

3. The method of claim 1 further comprising the first computer accessing supplemental information used to add a four digit extension to the mailing address data in the batch.

4. The method of claim 1 further comprising using the mailing list manipulation software to provide a postal presort on the mailing address data in the batch.

5. The method of claim 1 further comprising using the mailing list manipulation software to characterize the geographical distribution of the mailing address data in the batch.

6. The method of claim 1 further comprising the second computer having software which performs the extracting and updating steps.

7. A method of utilizing a mailing list resident on a user's computer as a plurality of records, comprising:

providing a provider's computer with provider resident software and provider resident supplemental information;

providing the user's computer with user resident software which extracts data from at least two of the records and transmits the extracted data to the provider's computer over a transmission line;

combining at least a portion of the extracted data with at least a portion of the supplemental information to produce modified data; and the first computer transmitting essentially the modified data and optionally reports related to the modified data back to the second computer.

8. The method of claim 7 further comprising electronically transmitting at least a portion of the modified data to the user's computer.

9. The method of claim 7 further comprising integrating at least a portion of the modified data into the mailing list.

10. The method of claim 7 wherein the provider resident software directs the user resident computer to perform the extracting step.

* * * * *